United States Patent [19]

Litchinko et al.

[11] Patent Number: 4,606,530
[45] Date of Patent: Aug. 19, 1986

[54] INSTALLATION AND PROCESS FOR CONTINUOUSLY CHARGING A REACTOR WITH SOLID MATERIAL AND HEATING SAID MATERIAL WITH THE GASES EMITTED FROM SAID REACTOR

[76] Inventors: Victor Litchinko, Résidence St-Sébastien, Tour C, 11 rue Haguenauer, 54000 Nancy; Igor Litchinko, 24 rue de la Sygrie, 92140 Petit-Clamart; Catherine Litchinko, Résidence St-Sébastien, Tour C, 11 rue Haguenauer, 54000 Nancy, all of France

[21] Appl. No.: 713,629

[22] Filed: Mar. 19, 1985

[30] Foreign Application Priority Data

Mar. 28, 1984 [FR] France ................... 8404827

[51] Int. Cl.$^4$ ............................................. C21C 5/40
[52] U.S. Cl. ................................. 266/158; 266/159; 266/175; 266/901; 75/29
[58] Field of Search ............... 266/158, 159, 175, 901; 75/29

[56]        References Cited
        U.S. PATENT DOCUMENTS

| 3,234,010 | 2/1966 | Mahony | 266/901 |
| 3,301,662 | 1/1967 | Ban | 75/55.5 |
| 3,425,676 | 2/1969 | Shekels | 266/140 |
| 3,533,612 | 10/1970 | Morton | 266/159 |

FOREIGN PATENT DOCUMENTS

| 1508297 | 10/1969 | Fed. Rep. of Germany . |
| 1508292 | 4/1971 | Fed. Rep. of Germany . |
| 3219984 | 1/1983 | Fed. Rep. of Germany . |
| 1138829 | 6/1957 | France . |
| 1312160 | 11/1962 | France . |
| 1331339 | 5/1963 | France . |
| 1387077 | 12/1964 | France . |
| 1401905 | 4/1965 | France . |
| 1434287 | 2/1966 | France . |
| 1494536 | 6/1968 | France . |
| 1548324 | 12/1968 | France . |
| 1589630 | 5/1970 | France . |
| 2202942 | 5/1974 | France . |
| 517873 | 2/1940 | United Kingdom . |
| 933353 | 8/1963 | United Kingdom . |
| 2064743 | 6/1981 | United Kingdom . |

Primary Examiner—L. Dewayne Rutledge
Assistant Examiner—Robert L. McDowell
Attorney, Agent, or Firm—Young & Thompson

[57]                ABSTRACT

The installation permits continuous charging of solid material (2) such as steel scrap into a reaction vessel (1) such as a converter for steel manufacture, the steel scrap being heated by heat exchange with the gases (G) emitted from the converter. To this end, the scrap (2) is fed into a compartment (3) provided with a discharge opening placed above the mouth (6) of the converter (1) from which the hot gases (G) are emitted, the scrap (2) is displaced towards the discharge opening (5) and the hot gases (G) are aspirated so as to circulate through the scrap (2) in countercurrent flow with respect to the direction of displacement (D) of the scrap.

13 Claims, 9 Drawing Figures

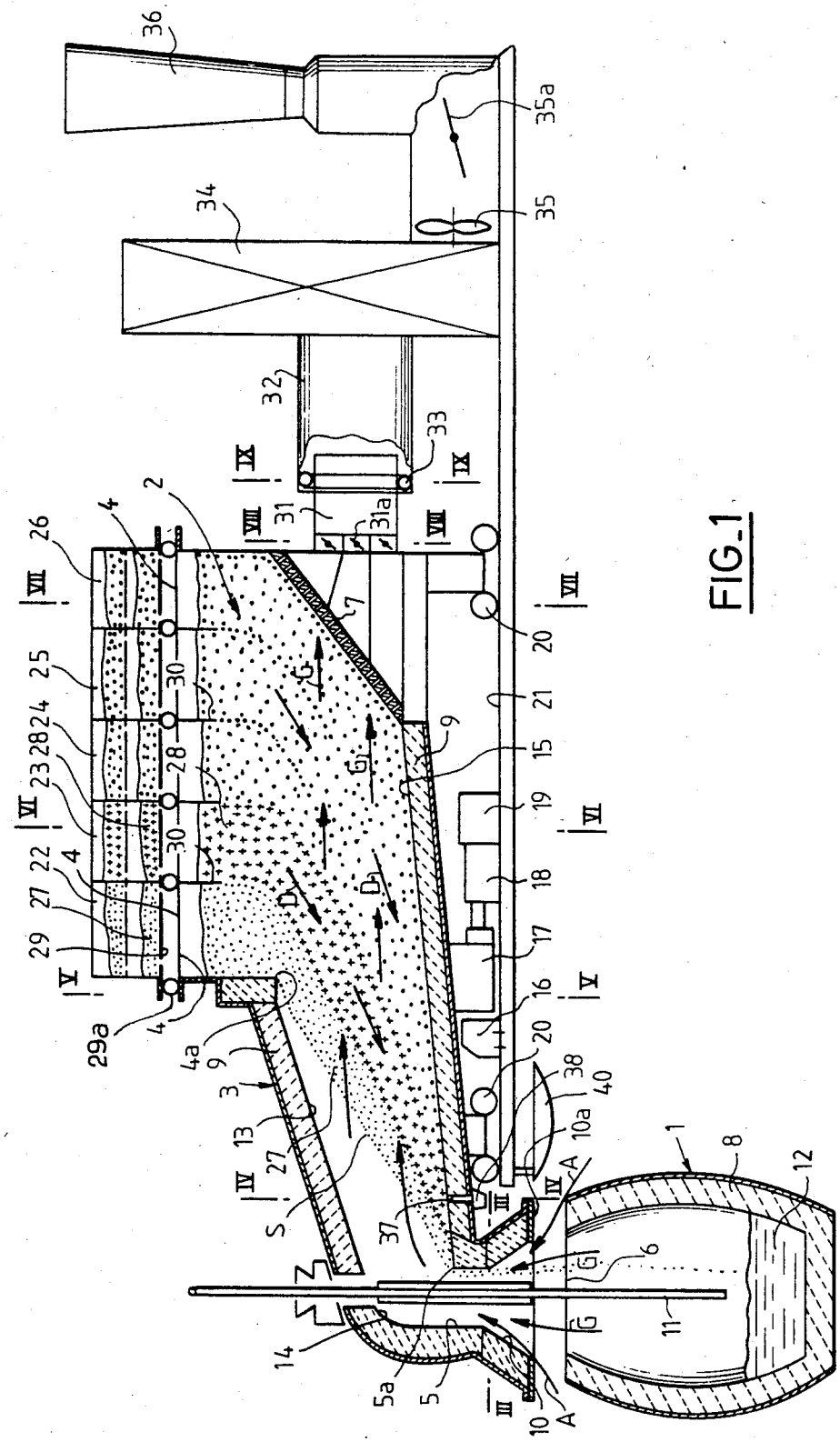
FIG_1

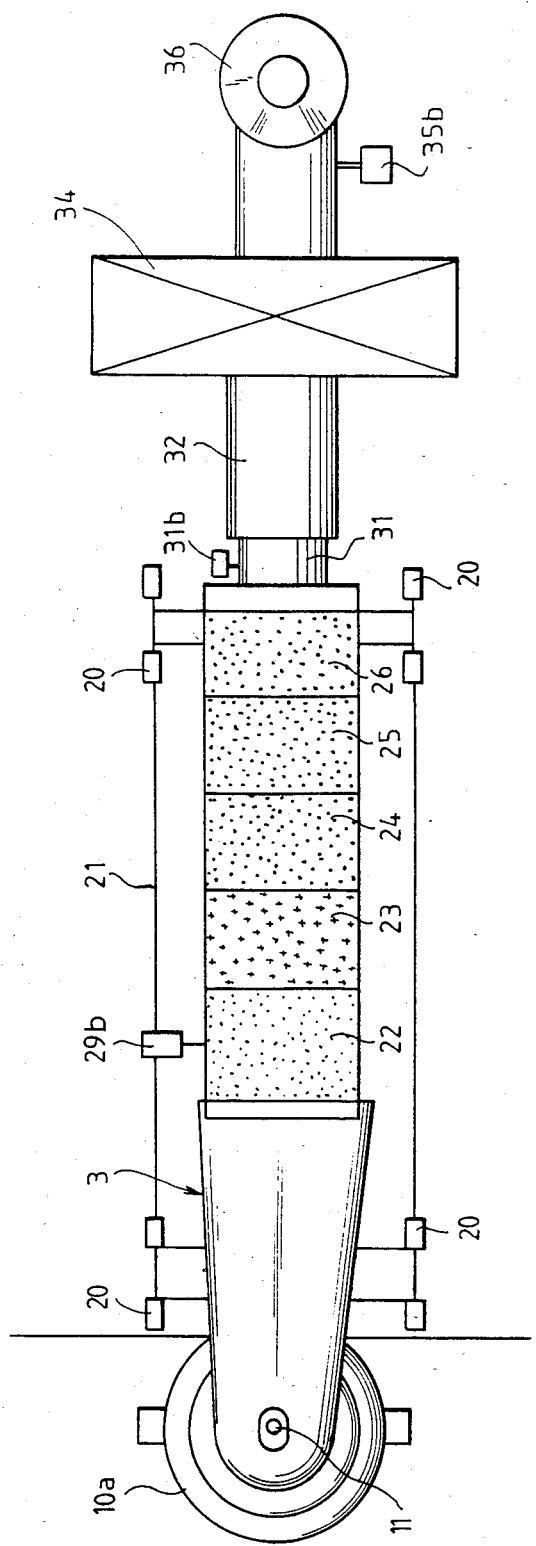
FIG_2

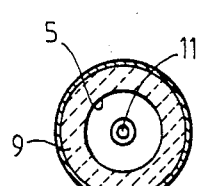
FIG_3
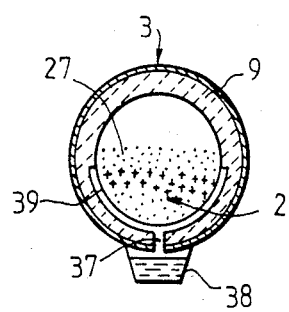
FIG_4
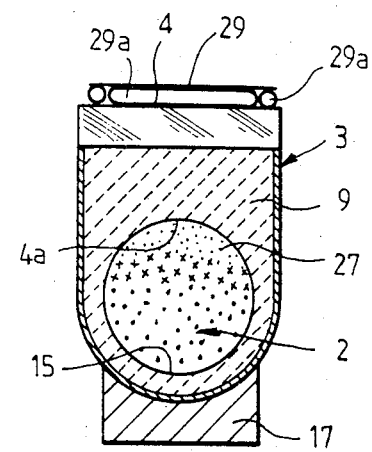
FIG_5
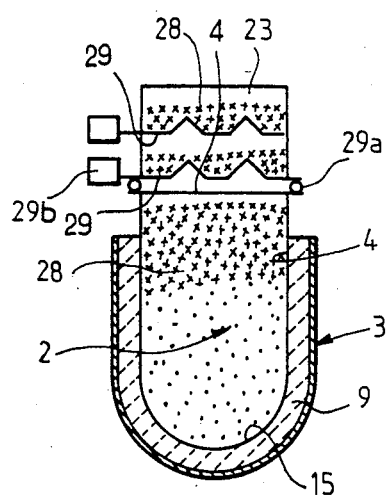
FIG_6
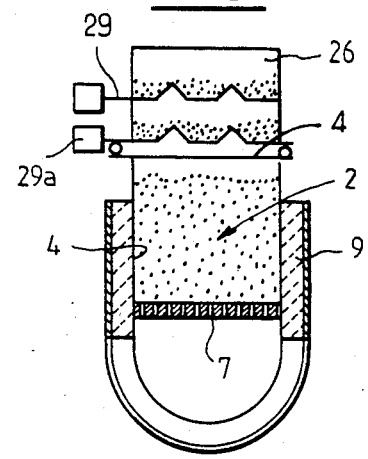
FIG_7
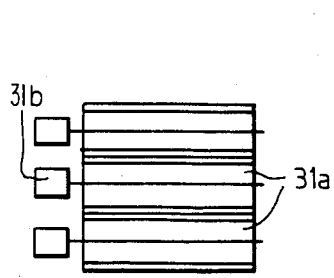
FIG_8
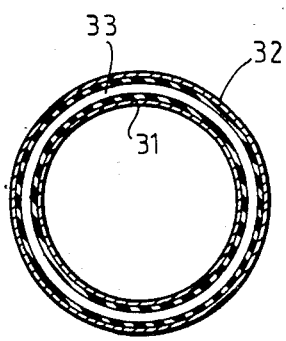
FIG_9

INSTALLATION AND PROCESS FOR CONTINUOUSLY CHARGING A REACTOR WITH SOLID MATERIAL AND HEATING SAID MATERIAL WITH THE GASES EMITTED FROM SAID REACTOR

BACKGROUND OF THE INVENTION

1. Field of the Invention

The present invention relates to an installation and a process for continuously charging solid material into a reactor and heating said material by heat exchange with the hot gases emitted from the reactor such as the smokes produced at the time of manufacture of steel from pig iron in a converter.

2. Description of the Prior Art

It is known that, in the production of steel from pig iron, a large quantity of hot combustible gases is emitted from the mouth of the converter.

In the past, the heat energy of this combustible gas was lost in nearly all cases.

With modern methods of conversion of pig iron by the use of oxygen, it has now become possible to recover a more or less substantial fraction of this energy.

Three modes of recovery of heat energy are essentially distinguished:

the so-called recuperation boilers which generate steam;

collection of gases by the so-called combustionless process; in this case the recovered gases are utilized as conventional fuel for various requirements;

heating of steel scrap by these gases or the resultant smokes prior to charging into the converter.

The distinctive features of these three modes of recovery are as follows:

when making use of recuperation boilers, an average of 50% of the latent and sensible heat is recovered but the production of steam follows the conversion cycle and is therefore non-continuous;

when collecting gases by the combustionless process, only the latent heat of gases is usually recovered in the case of non-continuous production of gas as mentioned above, thus entailing the need for storage in a gasometer; gas recovery remains at a medium level (about 50% of the total energy contained in the gases) on account of the precautions which have to be taken in order to guard against explosions;

when heating steel scrap and charging this material into the converter; the quantity of steel scrap required in order to produce one ton of steel can be increased whilst the quantity of pig iron can be correlatively reduced.

It is known that the production of pig iron calls for a very large amount of energy (4500 to 6000 thermies, namely 18.8 to 25 gigajoules per ton of pig iron).

To give a clear idea, the production of one ton of steel from high-phosphorus pig iron in accordance with modern methods requires on an average 750 kilograms of pig iron and 330 kilograms of cold steel scrap. At the time of this conversion, the bath emits gases which contain approximately 220 thermies (920 megajoules) in the form of latent and sensible heat per ton of pig iron. A 50% recovery therefore corresponds to 110 thermies (460 megajoules) recovered per ton of pig iron.

Recovery with heating of steel scrap permits the following results: when recovering 90% of the heat energy of the smokes, which is a reasonable expectation, the material and thermal balance shows that, in order to produce one ton of steel, it is necessary to consume 514 kilograms of pig iron and 530 kilograms of steel scrap or swarf. There are consequently consumed 750−514=236 kilograms less pig iron and 530−330=200 kilograms more steel scrap. The gain due to the non-manufactured pig iron is 0.236×4500=1062 thermies (4.44 gigajoules) as a minimum reduction per ton of steel produced. This figure is consequently much higher than the 220×0.750×0.9=148 thermies (621 megajoules) per ton of steel recovered in the smokes. Furthermore, by utilizing the heat contained in the smokes to an even greater extent, purification is thus achieved. Smoke purification is in fact made compulsory in practically all areas with a view to protecting the environment.

Among the known methods for heating steel scrap, the following are worthy of mention:

those which consist of surface licking or moderate penetration of steel scrap by hot smokes (reference may be made in this connection to French Pat. Nos. 1,312,160, 1,331,339, 1,387,077; German Pat. No. 1,508,292 and U.S. Pat. Nos. 3,425,676 and 3,533,612); the major disadvantage of the devices or processes described in these patents lies in a very incomplete recovery of the energy of gases unless provision is made for inordinate heat-exchange path lengths;

those which consist of intimate penetration of smoke through a mass of steel scrap which completely obstructs the smoke circulation system; in these methods, the scrap is always motionless or largely motionless during a production cycle (see French Pat. Nos. 1,138,829, 1,548,324, 1,589,630, 1,401,905 and German Pat. No. 1,508,297); in these devices, the degree of recovery is limited by the fact that the smokes leaving the system become progressively hotter during the heat exchange process;

those which make use of a rotary tunnel kiln (see French Pat. Nos. 1,138,829 and 1,434,287); by means of these recuperators, energy is recovered by radiation with fairly good efficiency in the hot portions but with low efficiency in the cold portions and inadequately by convection along the entire tunnel, thus entailing the need for excessive lengths if it is sought to utilize the entire thermal energy of the gases;

those which employ recuperators on grates through layers of steel scrap of moderate depth (see British Pat. No. 933,353 and U.S. Pat. No. 3,301,662); the crossed flow streams which are necessary in this case together with the fact that the smokes are discharged at very high temperature after passing through very hot scrap fail to permit total recovery of the heat energy of smokes.

In accordance with the present invention, the Applicant has established the fact that, in order to achieve a high degree of recovery of the heat energy of gases, the following conditions must be satisfied:

total collection without any leakage of gases and especially hot gases at any location;

prevention of parasitic admissions of cold air;

stoichiometric combustion of the gases;

penetration of the entire quantity of steel scrap by the entire quantity of smoke without any possible shortcircuit;

the need for a sufficient heat-exchange surface area (either by conditioning the steel scrap or by increasing the quantity of scrap);

the achievement of equilibrium of thermal flux values throughout the charge in order to prevent preferential heat-exchange processes or zones of insufficient heat exchange;

the need for continuous charging of cold steel scrap into the gas delivery circuit;

circulation of gases as far as possible with parallel countercurrent flow streams;

minimum heat loss through the walls, thus making it necessary among other things to ensure that the external surface area of the installation is as small as possible.

SUMMARY OF THE INVENTION

The object of the present invention is to satisfy the conditions outlined in the foregoing by providing an installation for continuously charging solid material into a reactor and heating said material by heat exchange with the hot gases emitted from the reactor, such as the smokes emitted from a converter at the time of manufacture of steel from pig iron and steel scrap.

In accordance with the invention, said installation essentially comprises a compartment provided with a top opening for charging solid material and a bottom opening for discharging said material. Said bottom opening is placed above the opening through which the hot gases are discharged from the reactor in order to enable said hot gases to penetrate into said compartment. Means are provided for displacing the solid material between the charge opening and the discharge opening of the compartment and for producing a heat-exchange surface between said solid material and the gases emitted from the reactor. In addition, the compartment comprises a discharge opening for the gases emitted from the reactor, said discharge opening being located opposite to the opening for admission of said gases and beneath the opening for charging solid material so as to ensure that said smokes circulate in countercurrent flow with respect to the direction of displacement of the solid material.

The device in accordance with the invention satisfies the conditions mentioned in the foregoing and permits a heat recovery which is higher than 90% with simultaneous charging of the solid material into the reactor. Said solid material is constituted, for example, by hot steel scrap fed into a converter during the manufacture of steel.

When the device is used for charging steel scrap into a converter, the continuous charging operation mentioned above offers a number of advantages:

saving of time as a result of charging of scrap outside oxygen-blowing periods;

avoidance of any appreciable cooling of pig iron during the charging operation (in accordance with current practice, the steel scrap is essentially charged at the same time as the pig iron) with all the consequences that such cooling would entail: a reaction which is slower and more irregular over a period of time;

the thermokinetics of certain production steps can be promoted by slightly modulating the hot-scrap charging rate;

the recuperation system returns the recovered heat energy almost immediately to the charge which has given rise to said energy.

The invention is also directed to a process for continuously charging solid material into a reactor and heating this latter by heat exchange with the hot gases emitted from the reactor.

In accordance with the invention, this process is distinguished by the fact that the solid material is introduced into a compartment having a discharge opening placed above the discharge opening for the hot gases of the reactor, said solid material is displaced towards the discharge opening, the hot gases emitted from the reactor are aspirated and thus caused to circulate through the solid material in countercurrent flow with respect to the direction of displacement of the solid material towards the discharge opening of the compartment.

BRIEF DESCRIPTION OF THE DRAWINGS

Other features of the invention will be more apparent upon consideration of the following description and accompanying drawings, wherein:

FIG. 1 is a schematic view in elevation and in partial longitudinal cross-section showing an installation in accordance with the invention;

FIG. 2 is a top view of the installation shown in FIG. 1;

FIG. 3 is a sectional view taken in the plane III—III of FIG. 1;

FIG. 4 is a sectional view in the plane IV—IV of FIG. 1;

FIG. 5 is a sectional view in the plane V—V of FIG. 1;

FIG. 6 is a sectional view in the plane VI—VI of FIG. 1;

FIG. 7 is a sectional view in the plane VII—VII of FIG. 1;

FIG. 8 is a sectional view in the plane VIII—VIII of FIG. 1;

FIG. 9 is a sectional view in the plane IX—IX of FIG. 1.

DETAILED DESCRIPTION OF THE INVENTION

The accompanying figures illustrate an installation for continuously charging a converter 1 with steel scrap 2 and heating the scrap by heat exchange with the hot gases G which leave the top of the converter 1.

In accordance with the invention, this installation comprises a compartment 3 having a top opening 4 for charging steel scrap, or scrap charge opening, and a bottom opening 5 for discharging steel scrap, or scrap discharge opening which is placed above the discharge opening 6 for the hot gases G of the converter 1 in order to permit penetration of said gases into the compartment 3.

Means which will hereinafter be described in greater detail are provided for displacing the steel scrap 2 between the charge opening 4 and the discharge opening 5 of the compartment 3 and producing a heat-exchange surface between said scrap and the gases G emitted from the converter 1.

The compartment 3 further comprises an opening 7 through which the gases G emitted from the converter 1 are discharged. Said opening 7 is located opposite to the opening 5 through which said gases are admitted and beneath the opening 4 for charging steel scrap 2. This arrangement ensures that said gases G circulate counter-currentwise in slightly crossed streams (as indicated by the arrow in FIG. 1) with respect to the direction of displacement D of steel scrap.

The interior of the converter 1 is provided with a lining 8 of refractory material. A lining 9 of refractory material is also provided within the interior of the compartment 3.

It is apparent from FIG. 1 that the top charge opening 4 of the compartment 3 is displaced with respect to the bottom discharge opening 5 in the direction of displacement D of the steel scrap 2. This relative displacement between the two openings 4 and 5 is such that the solid material 2 forms between the downstream bottom edge 4a of the charge opening 4 and the upstream edge 5a of the discharge opening 5 a bank which constitutes the solid-material surface S attacked by the smokes.

The scrap discharge opening 5 of the compartment 3 has a downwardly flared surface 10, the free edge 10a of which is located at a predetermined distance from the gas discharge opening 6 or mouth of the converter 1.

The space thus formed serves to set up a circulation of air (as indicated by the arrows A of FIG. 1) which impels the hot gases in the direction of the arrows G.

The cross-sectional area of the discharge opening 5 of the compartment 3 is smaller than the crosssectional area of the opening 6 through which the hot gases G are discharged from the converter 1. An oxygen lance 11 placed in the axis of said openings 5 and 6 has the function of blowing oxygen into the melt 12 contained in the converter 1, in the particular case of top blowing of oxygen.

The top wall 13 of the compartment 3 has a downwardly inclined surface 13 in the region located between the top charge opening 4 and the bottom discharge opening 5, said surface 13 being joined to the discharge opening 5 by means of a curved surface 14.

The opening 7 through which the gases G are discharged from the compartment 3 is a grid which extends from the bottom wall 15 of the compartment 3 and is inclined at an angle of slope which is substantially identical with that of the smoke-attack surface S formed by the bank of steel scrap 2.

Furthermore, the bottom wall 15 of the compartment 3 can be inclined towards the bottom discharge opening 5. This angle of inclination is variable as a function of the characteristics of the scrap material 2 employed.

As also shown in FIG. 1, the compartment 3 is movably mounted on rollers 20 placed on a horizontal or inclined roller track 21 and adapted to run over a predetermined range of travel in the general direction D of displacement of the scrap material 2. The end of said range of travel corresponds to the position in which the discharge openings 5, 6 of the compartment 3 and of the converter 1 are located one above the other. This position is defined by a stationary stop 16 and a movable stop 17 attached to the bottom wall 15 of the compartment 3. Means such as a jack 18 applied against a stationary portion 19 are provided for thrusting the compartment 3 towards the stationary stop 16 so as to subject said compartment to a shock impact as it comes into contact with the two stops 16, 17. Said jack 18 also serves to return said compartment 3 to the initial position.

It is also shown in FIGS. 1 and 2 that the charge opening 4 of the compartment 3 is surmounted by double-stage feed bins 22, 23, 24, 25, 26 which contain solid materials having different compositions. Each stage is fitted with a gate 29, the operation of which is not simultaneous with the operation of the other stage.

In the example illustrated, the first bin 22 which is adjacent to the downstream edge 4a of the charge opening 4 contains lime 27, the following bin contains oily steel scrap 28 and the other bins contain ordinary steel scrap 2.

The two gates 29 of each stage of said feed bins 22 to 26 are each actuated by a jack 29b (as shown in FIGS. 6 and 7) for pouring the solid material into the compartment 3. The vertical walls which form separations between the bins 22 to 26 are extended in the downward direction so as to penetrate into the solid material and thus form baffle-plates 30 which prevent the gases G from passing above the scrap materials 2.

Between the bottom portion of the bins 22 to 26 and the top edge of the charge opening 4 are placed seals 29a (as shown in FIGS. 1 and 5) which provide leak-tightness between the different bins 22 to 26 and the interior of the compartment 3 while permitting displacement of this latter with respect to the bins.

The inclined grid 7 through which the gases G leave the compartment 3 after having passed through the scrap material 2 is connected to a device for purifying these gases. This device comprises a pipe 31 slidably mounted in gas-tight manner within a pipe 32 by means of an O-ring seal 33 (as shown in FIGS. 1 and 9). The pipe 32 opens into a smoke purifier 34 provided at its outlet with a smoke extractor 35 which discharges the smoke to the stack 36.

The flow rates of the smoke G which penetrates into the pipe 31 are adjustable by means of superposed rotary balancing shutters 31a controlled by servomotors 31b (as shown in FIGS. 1 and 8). A rotary shutter 35a for regulating the main flow rate is placed on the downstream side of the extractor 35 and actuated by a servomotor 35b (as shown in FIG. 2).

In FIGS. 1 and 4, it is further apparent that the bottom wall 15 of the compartment 3 is provided with an orifice 37 located at a short distance upstream of the outlet or discharge opening 5. Beneath said orifice 37 is placed a vessel 38 for collecting nonferrous materials which are fusible at the mean temperature of the scrap at this location. In order to facilitate removal of these fusible materials through the orifice 37, channels 39 (as shown in FIG. 4) are formed on each side of said orifice 37 in the refractory lining 9 of the bottom wall of compartment 3. Said channels 39 extend to a sufficient height of the side walls of the compartment 3.

In addition, a cup 40 is provided near the flared outlet surface 10 of the compartment 3. When said cup is placed beneath the opening 10 at the time of stoppage, it has the function of collecting any scrap which might fall accidentally. Another function of the cup is to close-off the outlet 10 of the compartment 3 during periods of shutdown of the installation.

The operation of the installation described in the foregoing will now be explained.

At the initial instant, the outlet 5 of the compartment 3 is centered on the mouth of the converter 1 and the cup 40 is in the withdrawn position as shown in FIG. 1. The oxygen lance 11 is displaced in the downward direction and the extractor 35 begins at the same time to aspirate the gases G of the converter 1 and the ambient combustion air A. The flow rate of aspirated air is so adjusted as to ensure that the smokes are neutral at the exit of the installation.

The installation is then in readiness to operate.

Hot steel scrap or thermally equivalent swarf is added if this is either permitted or made necessary by the temperature of the melt 12. To this end, the compartment 3 is moved back towards the right as shown in FIG. 1 so as to ensure that the outlet 5 is again located above the mouth 6 of the converter 1. This movement takes place at a relatively low speed and is performed by the jack 18 or an oppositely-acting jack of similar type. The compartment 3 is then rapidly accelerated towards the left by means of the jack 18. As soon as the outlet 5 of the compartment 3 is centered above the mouth of the converter 1, the movement of the compartment 3 is stopped abruptly by means of the stationary stop 16. Under the action of this impact, the steel scrap 2 or thermally equivalent swarf continues to advance by inertia and falls into the converter 1 under the action of gravity. The quantity of scrap 2 thus added is regulated either by the frequency or by the intensity of impacts or by both at the same time.

The same forward motion of steel scrap 2 can be obtained in the case of small installations by coupling the moving compartment 3 to an elastic system and to a system which possesses a force having a cyclic horizontal component, the frequency of which is such that the moving compartment 3 is subjected to oscillating motion in resonance. In this case, the forward inertial motion of the scrap material 2 is due to deceleration of the compartment 3 and to the fact that the scrap material 2 is capable of moving forward only along the downward slope of the bottom wall 15 of the moving compartment 3.

In the example shown in the drawings, charging of cold steel scrap 2 into the compartment 3 is carried out by means of stationary bins 22 to 26 in order to reduce the mass which is in motion. However, bins which form an integral part of the compartment 3 would also be suitable.

The installation in accordance with the present invention can be employed at the time of manufacture of steel from pig iron in converters designed for blowing of oxygen either from the top downwards or from the bottom upwards. This installation is also applicable to continuous steelmaking installations, to electric furnaces and to any type of reaction vessel from which emitted gas containing heat energy is capable of heating the solid materials and is of interest for the purpose of returning said gas in the form of heat to the reactor in which it was initially generated.

As will readily be understood, the invention is not limited to the example described in the foregoing and a large number of modifications may accordingly be contemplated without thereby departing either from the scope or the spirit of the invention.

From this it follows that the means described for displacing the steel scrap material could be modified or replaced by other means such as, for example, a movable wall placed behind the steel scrap and adapted to thrust the scrap towards the discharge opening of the compartment.

Furthermore, means could be provided for tilting the compartment in order to increase the angle of slope of the bottom compartment wall.

What is claimed is:

1. An installation for continuously charging solid material (2) into a reactor (1) and heating said material by heat exchange with the hot gases (G) emitted from said reactor (1), wherein said installation comprises a compartment (3) provided with a top opening (4) for charging solid material (2) and a bottom opening (5) for discharging said material, said bottom opening being placed above the opening (6) through which the hot gases (G) are discharged from the reactor (1) in order to enable said hot gases to penetrate into said compartment (3), means for displacing said solid material between the charge opening (4) and the discharge opening (5) of the compartment and for producing a heat-exchange surface between said solid material (2) and the gases (G) emitted from the reactor (1), the compartment (3) being further provided with a discharge opening (7) for the gases emitted from the reactor, said discharge opening being located opposite to the opening (5) for admission of said gases and beneath the opening (4) for charging solid material (2) so as to ensure that said gases (G) circulate in countercurrent flow with respect to the direction of displacement (D) of said solid material (2).

2. An installation according to claim 1, wherein said installation comprises means (35) for aspirating the gases (G) as they pass out of the opening (7).

3. An installation according to claim 1, wherein the top opening (4) for charging the compartment (3) is displaced with respect to the bottom discharge opening (5).

4. An installation according to claim 3, wherein the relative displacement between the two openings (4 and 5) is such that the solid material (2) forms between the downstream edge (4a) of the charge opening (4) and the upstream edge (5a) of the discharge opening (5) a bank constituting an inclined smoke-attack surface (S).

5. An installation according to claim 1, wherein the discharge opening (5) of the compartment (3) has a downwardly flared surface (10), the free edge (10a) of said surface being located at a predetermined distance above the gas outlet (6) of the reactor (1).

6. An installation according to claim 5, wherein the cross-sectional area of the discharge opening (5) of the compartment (3) is smaller than the cross-sectional area of the hot-gas outlet (6) of the reactor (1).

7. An installation according to claim 1, wherein the opening (7) through which the gases (G) are discharged from the compartment (3) is a grid which extends from the bottom wall (15) of the compartment and has an angle of slope substantially identical with the angle of slope of said smoke-attack surface (S) formed by the solid material (2).

8. An installation according to claim 1, wherein the compartment (3) is mounted so as to be capable of moving over a predetermined range of travel which extends in the direction of displacement (D) of the solid material (2), the end of travel being such as to correspond to the position in which the outlet (5) of the compartment (3) and the outlet (6) of the reactor (1) are located one above the other, this position being defined by a stationary stop (16) and a movable stop (17) attached to the compartment (3), means (18) being provided for thrusting the compartment (3) towards the stationary stop (16) in order to obtain a shock impact as said compartment comes into contact with the two stops (16 and 17) and in order to return said compartment (3) to the initial position.

9. An installation according to claim 1, wherein the charge opening (4) of the compartment (3) is surmounted by double-stage feed bins (22 to 26), each stage being closed by a gate, the lower portions of said feed bins being provided with partition-walls (30) which penetrate into the solid material.

10. An installation according to claim 1, wherein the opening (7) for the discharge of smokes (G) communicates with a device (34) for purifying said smokes.

11. An installation according to claim 1, wherein the bottom wall (15) of the compartment is provided on the upstream side of the bottom discharge opening (5) with an orifice (37) which communicates with a vessel (38) for collecting materials which are readily fusible at the temperature of the steel scrap at the location of said orifice.

12. A process for continuously charging solid material (2) into a reactor (1) and heating said material by heat exchange with the hot gases (G) emitted from said reactor (1), comprising the steps of: feeding said solid material (2) into a compartment (3) provided with a discharge opening (5) placed above the outlet (6) for the hot gases (G) of the reactor (1); displacing said solid material (2) in said compartment (3) toward the discharge opening (5); aspirating said hot gases (G) emitted from the reactor (1) so as to circulate said hot gases (G) through said solid material (2) in countercurrent flow with respect to the direction of displacement (D) of the solid material toward the discharge opening (5) of the compartment (3).

13. A process according to claim 12, wherein said displacing step is effected by subjecting said compartment to successive jerks directed toward the discharge opening (5) of said compartment.

* * * * *